United States Patent
Wagh et al.

(10) Patent No.: US 7,609,779 B2
(45) Date of Patent: Oct. 27, 2009

(54) RF TRANSMITTER WITH INTERLEAVED IQ MODULATION

(75) Inventors: Poojan A. Wagh, Sleepy Hollow, IL (US); Lawrence E. Connell, Naperville, IL (US); Matthew R. Miller, Arlington Heights, IL (US)

(73) Assignee: Freescale Semiconductor, Inc., Austin, TX (US)

( * ) Notice: Subject to any disclaimer, the term of this patent is extended or adjusted under 35 U.S.C. 154(b) by 451 days.

(21) Appl. No.: 11/363,463

(22) Filed: Feb. 27, 2006

(65) Prior Publication Data

US 2007/0201581 A1 Aug. 30, 2007

(51) Int. Cl.
*H04L 27/00* (2006.01)

(52) U.S. Cl. ...................................... 375/295

(58) Field of Classification Search ................. 375/261, 375/295, 298, 279, 283, 308; 332/103–105
See application file for complete search history.

(56) References Cited

U.S. PATENT DOCUMENTS

| | | | |
|---|---|---|---|
| 4,959,654 A * | 9/1990 | Bjorke et al. ................. | 342/120 |
| 6,259,747 B1 | 7/2001 | Gustafsson et al. | |
| 6,563,883 B1 | 5/2003 | Leinonen et al. | |
| 6,587,010 B2 | 7/2003 | Wagh et al. | |
| 6,735,426 B1 | 5/2004 | Pau | |
| 7,519,348 B2 * | 4/2009 | Shah ........................... | 455/285 |
| 2001/0016016 A1 | 8/2001 | Eidson et al. | |
| 2004/0137862 A1 | 7/2004 | Tanaka et al. | |
| 2006/0291589 A1* | 12/2006 | Eliezer et al. ................ | 375/302 |
| 2007/0218850 A1* | 9/2007 | Pan .......................... | 455/189.1 |

OTHER PUBLICATIONS

U.S. Appl. No. 10/739,282, filed Dec. 19, 2003, Tanaka et al.
U.S. Appl. No. 10/807,207, filed Mar. 22, 2004, Malone et al.
U.S. Appl. No. 10/975,104, filed Oct. 19, 2004, Vorenkamp et al.
U.S. Appl. No. 11/041,422, filed Jan. 25, 2005, Sorrells et al.
International Search Report and Written Opinion for correlating PCT Patent Application No. PCT/US07/61915 dated Aug. 27, 2008.

* cited by examiner

*Primary Examiner*—Tesfaldet Bocure
(74) *Attorney, Agent, or Firm*—Ingrassia, Fisher & Lorenz, P.C.

(57) ABSTRACT

An RF modulator supporting wide-band signals includes IQ modulation by interleaving the in-phase and quadrature signals. The modulator can be implemented using an integrated circuit having a baseband in-phase stage that receives an in-phase analog input signal, a baseband quadrature stage that receives a quadrature analog input signal, and a switching mixer having a plurality of switches. The switching mixer receives in-phase and quadrature signals from the baseband in-phase stage and the baseband quadrature stage. The switching mixer produces a differential signal combining the in-phase and quadrature signals by interleaving the signals over a plurality of phases of a carrier period.

14 Claims, 5 Drawing Sheets

RF TRANSMITTER WITH INTERLEAVED IQ MODULATION

FIELD OF THE INVENTION

In general, the present invention relates to the field of communications systems. More specifically, the present invention relates to the generation of modulated radio frequency ("RF") signals having an interleaved IQ modulation.

BACKGROUND

Modem communication systems, such as cellular telephones, generally communicate using radio frequency (RF) signals. Voice/data input into a cellular telephone is a low frequency or baseband signal. A transmitter converts the baseband signal to a radio frequency signal for transmission by the cellular telephone. The baseband signal is passed through a low frequency stage, converted to a radio frequency, and passed through a high frequency stage.

The baseband signal can be converted using any of a variety of modulation techniques. IQ modulation, also known as Quadrature Amplitude Modulation (QAM), is a method for sending two separate (and uniquely different) channels of information where the carrier signal is shifted to create two carriers—sine and cosine versions. Conventionally, two modulation inputs are applied to two separate modulators, each of which are supplied with sine or cosine carriers. The outputs of both modulators are algebraically summed; the result of which is a single signal to be transmitted, containing the I and Q information. On receipt, the composite signal (I and Q) is processed and extracted by the receiver using a carrier replica (sine and cosine).

Switched-mode mixers or modulators have been shown to present improved noise, linearity, and current-drain performance. Heretofore, switched-mode modulators have only been able to operate on a single signal, such as amplitude modulation (AM). If the output of two such modulators were resistively summed to produce an in-phase and quadrature ("IQ") modulator, a 50% reduction in efficiency results over the underlying AM modulator since the I and Q signals oppose each other on average 50% of the time.

U.S. Pat. No. 7,194,242 to Tanaka entitled "Direct-Conversion Transmitter Circuit and Transceiver System" describes two sets of Gilbert Cell mixers with current summation to produce an IQ-modulated signal. Gilbert Cell mixers are popular double-balanced mixers used in RFIC (radio frequency integrated circuit) designs. The Gilbert Cells require large amounts of current in order to maintain linearity and low noise. There is also a significant wasting of current in such designs. U.S. Pat. No. 6,587,010 to Wagh, et al. entitled "Modulated radio frequency signal generation method and modulated signal source" describes a system where input I and Q signals are encoded as 1-bit signals using pulse width modulation, pulse density modulation, etc. However, this system does not provide for analog inputs.

DETAILED DESCRIPTION OF EXEMPLARY EMBODIMENTS

Figure 1:
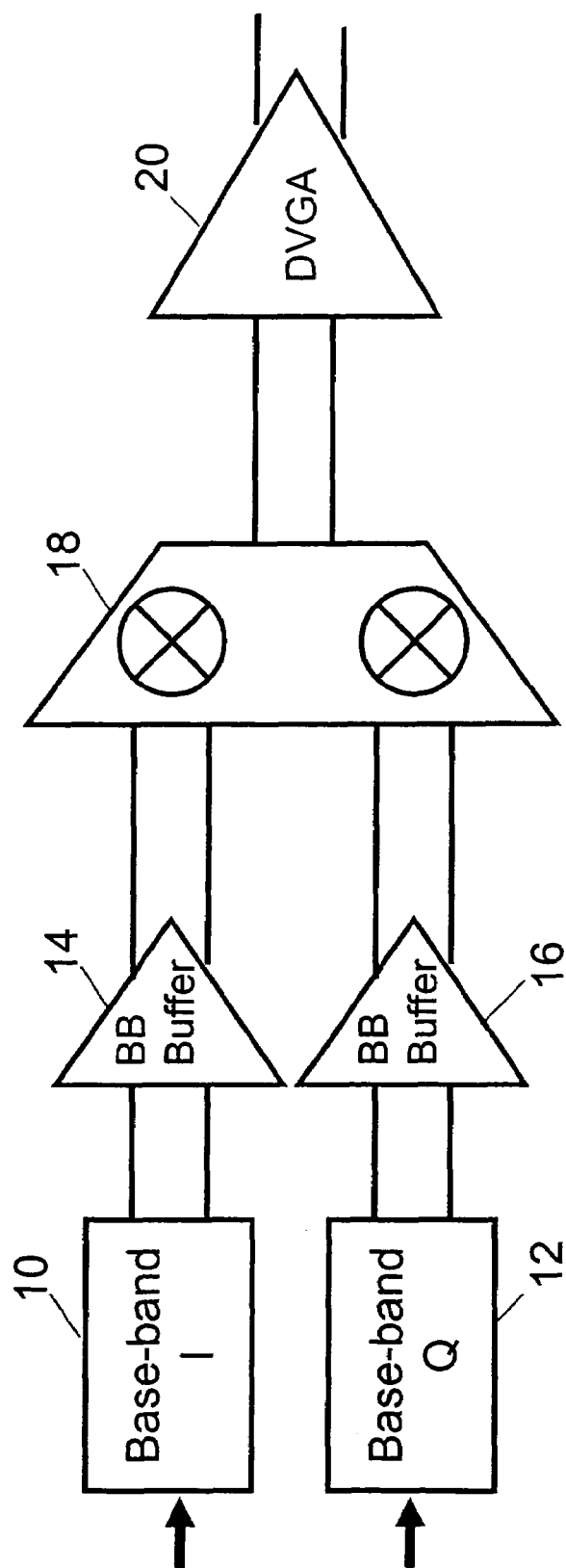
FIG. 1 is a block diagram of an interleaved IQ modulation system in accordance with an exemplary embodiment.

According to an exemplary embodiment, FIG. 1 illustrates an interleaved IQ architecture comprising a baseband stage 10 including in-phase signals, a baseband stage 12 including quadrature signals, a baseband buffer 14, a baseband buffer 16, a switching mixer 18, and an attenuator 20. The baseband buffers 14 and 16 may also be incorporated into the baseband stages 10 and 12. The interleaved IQ architecture may include additional, different, of fewer components.

Figure 3:
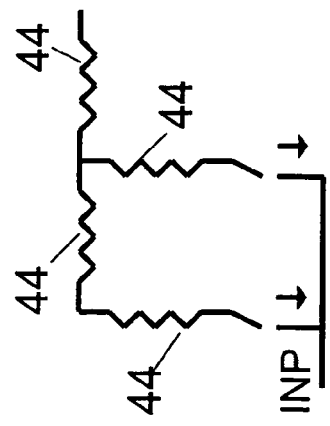
FIG. 3 is a schematic representation of a passive R-2R ladder architecture used in the interleaved IQ modulation system of FIG. 1 in accordance with an exemplary embodiment.

The attenuator 20 can be a digital variable gain amplifier (DVGA). For example, a passive R-2R ladder architecture can be used, as shown in FIG. 3. The R-2R ladder architecture includes a plurality of resistors 44 connected in parallel or series. The number of resistors in parallel or series depends on how many attenuation steps are desired. The R-2R ladder architecture provides substantially constant output impedance, such as 50 ohms, regardless of power. The attenuator 20 may include additional, different, or fewer components.

A low frequency amplitude signal is input to baseband stages 10 and 12. The signal input to the baseband stage 10 is an in-phase (I) signal and the signal input to the baseband stage 12 is a quadrature (Q) phase signal. The I and Q signals are baseband signals and may include voice or data from a communication device user, such as a cellular phone user. The baseband stages provide amplitude modulation signals to buffers 14 and 16. Buffers 14 and 16 can be operational amplifiers (op-amps). The buffers 14 and 16 filter the amplitude modulation signals to remove high frequency noise. In addition, the buffers 14 and 16 may amplify the amplitude signals. The filtered signals are provided to the switching mixer 18. The switching mixer 18 also receives a clock signal from a local oscillator (not shown in FIG. 1) or other clocking mechanism. The switching mixer 18 combines the signals by interleaving the signals over phases of the carrier period. For example, where signals are communicated every ¼ carrier period, in-phase signal $+I_1$ and in-phase signal $-I_1$ are communicated during a first phase, quadrature-phase signal $+Q_2$ and quadrature-phase signal $-Q_2$ are communicated during a second phase, in-phase signal $-I_3$ and in-phase signal $+I_3$ are communicated during a third phase, and quadrature-phase signal $-Q_4$ and quadrature-phase signal $+Q_4$ are communicated during a fourth phase.

The switching mixer 18 up-converts the signal for transmission by an antenna. In accordance with an exemplary embodiment, FIG. 6 shows one embodiment of a mobile telephone 60 with a transmitter that converts baseband signals to radio frequency signals for transmission. The baseband signal is passed through a low frequency stage, converted to a radio frequency, and then passed through a high frequency stage. A high frequency path includes an antenna 66, a portion of an integrated circuit 64 for up-converting a low frequency signal to a high frequency signal, and a conductor connecting the antenna 66 and integrated circuit 64. The integrated circuit 64 can include the interleaved IQ modulation system described with reference to FIGS. 1-5. Additional, different, or fewer components may be provided. For example, the integrated circuit 64 could be implemented as an application specific integrated circuit, processor, digital signal processor, field programmable gate array, digital circuit, analog circuit, or combinations thereof.

The high frequency path is a transmitter for operation pursuant to the Global System for Mobile (GSM) or Enhanced Data Rates for GSM Evolution (EDGE) specifications for cellular telephones. GSM operates using Gaussian Minimum Shift Keying (GMSK) while EDGE operates using 8 Phase Shift Keying (8-PSK). The 8-PSK used in EDGE places greater radio frequency performance requirements on the high frequency path. For example, higher linearity is desired because 8-PSK is more sensitive to nonlinear distortion. Other transmission schemes in addition to those mentioned can also be used.

Figure 2:
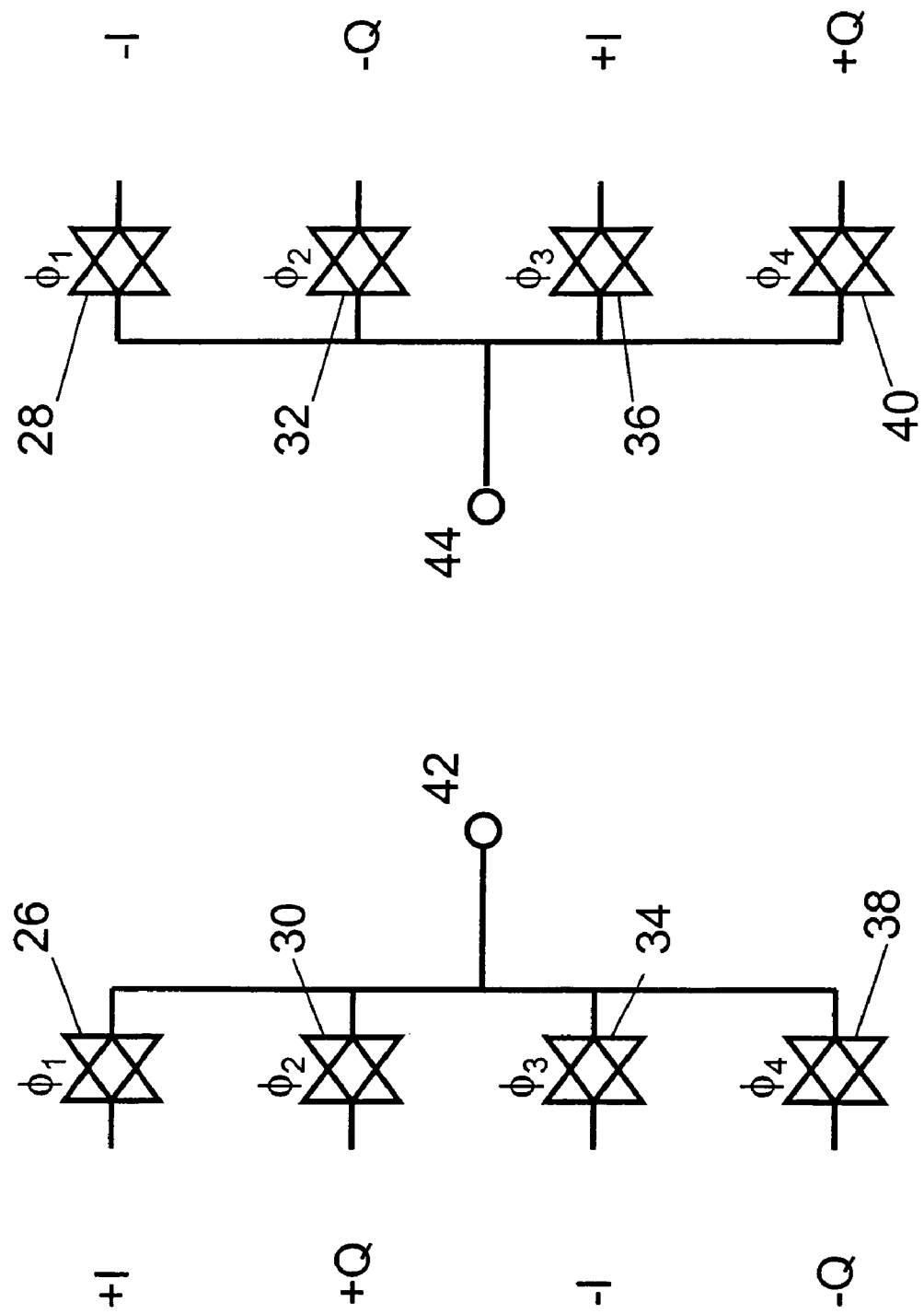
FIG. 2 is a schematic representation of a switching mixer used in the interleaved IQ modulation system of FIG. 1 in accordance with an exemplary embodiment.

FIG. 2 illustrates a schematic of the switching mixer 18 having a number of switches. In an exemplary embodiment, the switches are transmission gates (T-gates) 26, 28, 30, 32, 34, 36, 38, and 40. Alternatively, n-channel gates can be used as the switches. N-channel gates may further reduce power consumption in the circuit. In yet another embodiment, GaAs switches are employed. The speed of the switches in FIG. 2 are useful at 100 MHz to 6 GHz, for example, including the 1-2 Ghz range used in communication systems. The T-gates 26, 28, 30, 32, 34, 36, 38, and 40 are operated over one carrier period to produce differential outputs 42 and 44. That is, each phase ($\phi_{1-4}$) operates for ¼ carrier period. T-gates 26 and 28 operate at a phase $\phi_1$, T-gates 30 and 32 operate at a phase $\phi_2$, T-gates 34 and 36 operate at a phase $\phi_3$, and T-gates 38 and 40 operate at a phase $\phi_4$.

The switching mixer of FIG. 2 modulates high-bandwidth signals and/or signals with large peak-to-average ratios. The switching mixer benefits from higher efficiency, higher linearity, and lower noise than conventional summers used in IQ modulation. Indeed, the switching mixer removes the 50% efficiency loss penalty involved in resistively summing I and Q signals. The high bandwidth supported by the switching mixer of FIG. 2 is important because a polar architecture requires roughly 5× the bandwidth of a Cartesian modulator. In narrowband communications (e.g., GSM, EDGE), the high bandwidth required by a polar architecture is not an issue. If polar architecture is used, a polar lite architecture can be utilized as described in U.S. patent application Ser. No. 11/086045 entitled "Higher Linearity Passive Mixer" which is incorporated in its entirety herein by reference. However, in wide-band communications (e.g., 3G, OFDM, etc.), the polar architecture requires very large bandwidths. The switching mixer of FIG. 2 requires less bandwidth using interleaved IQ modulation which, as discussed above, does not suffer from a summation penalty.

Figure 4:
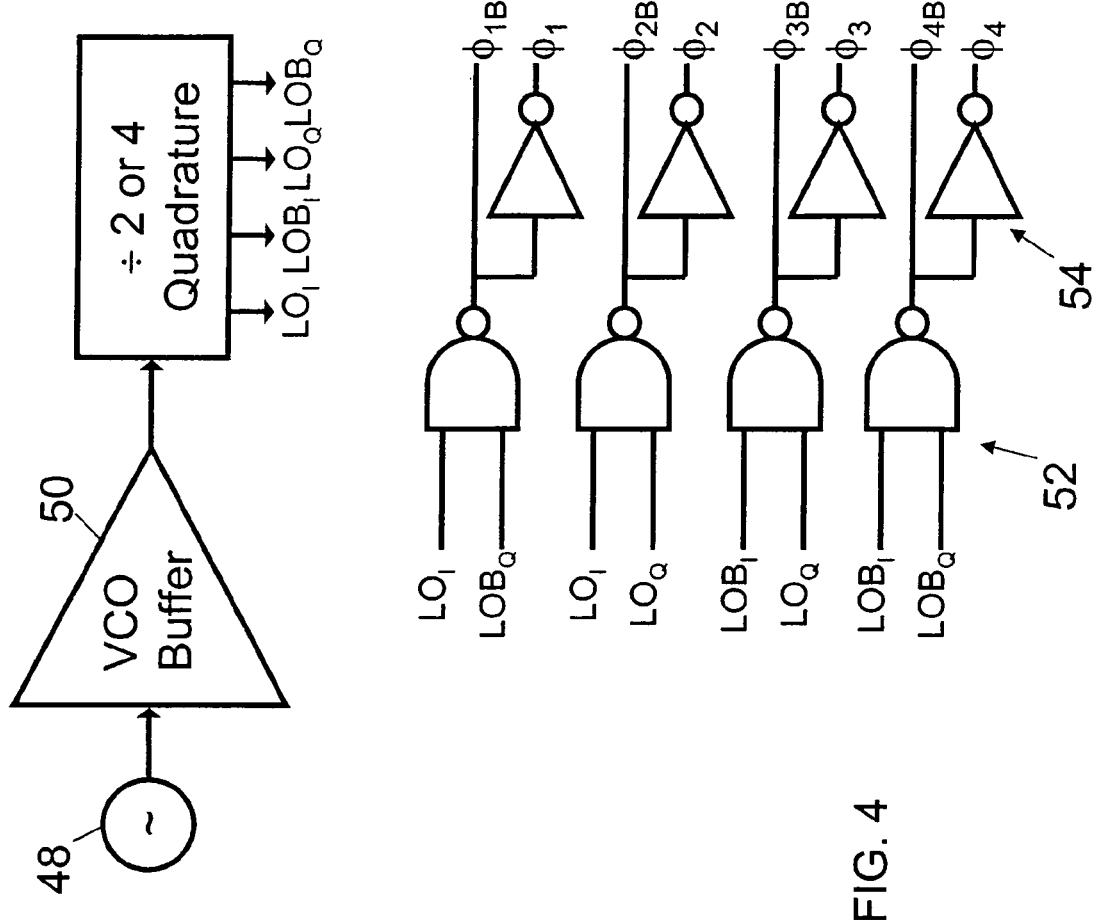
FIG. 4 is a schematic representation of a clocking mechanism utilized with the switching mixer of FIG. 2 in accordance with an exemplary embodiment.

FIG. 4 illustrates an exemplary clocking mechanism utilized with the switching mixer of FIG. 2. A oscillator 48 sends a signal to a voltage-controlled oscillator (VCO) buffer 50 which, in turn, drives a divide-by-2 or a divide-by-4 circuit to produce in-phase and quadrature clocking signals with complementing signals such that the switching mixer is fully differential. As illustrated in FIG. 4, the clocking signals can be generated using NAND gates 52 and inverters 54.

Figure 5:
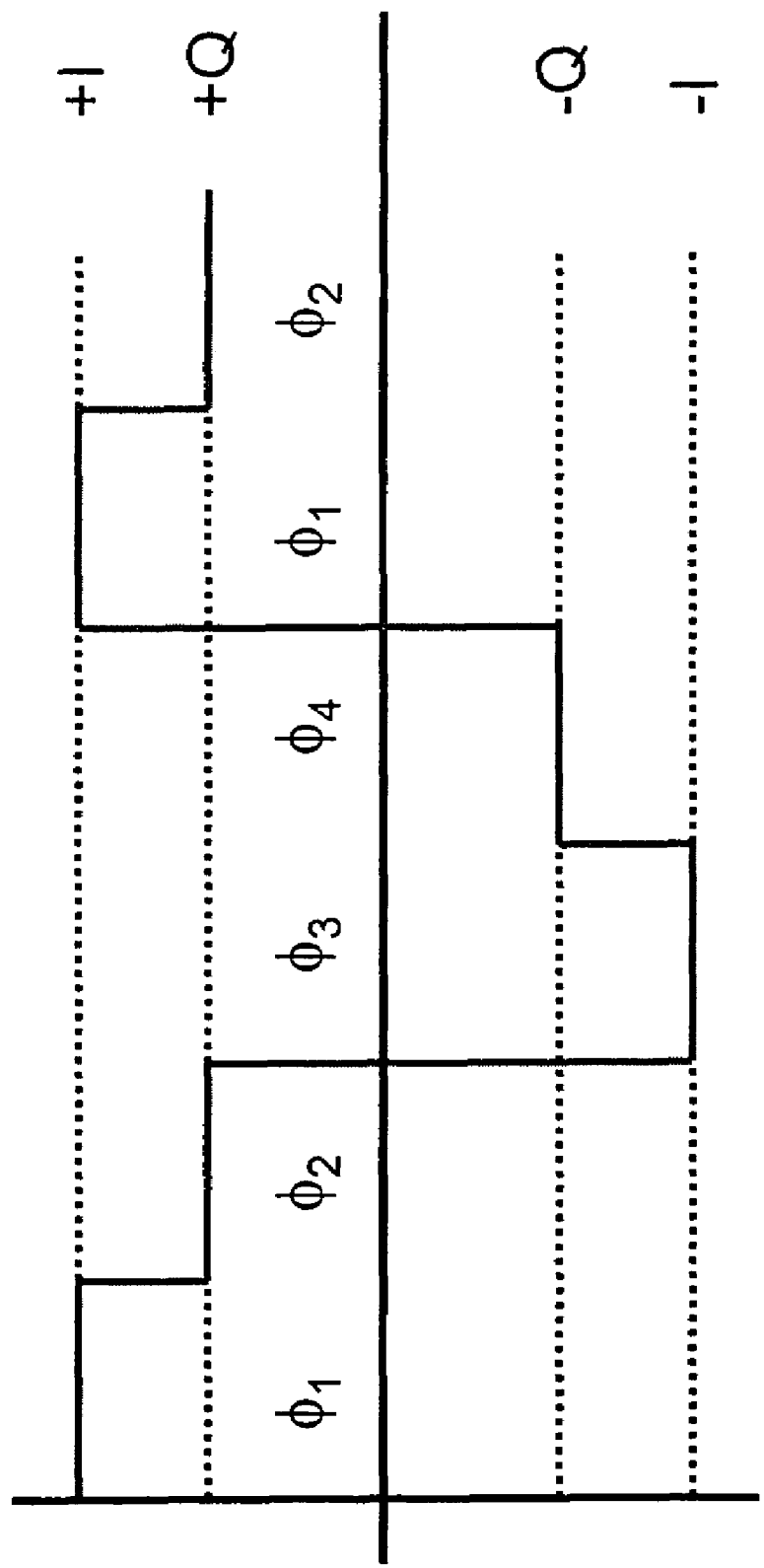
FIG. 5 is a waveform depicting the output from the switching mixer of FIG. 2.
Figure 6:
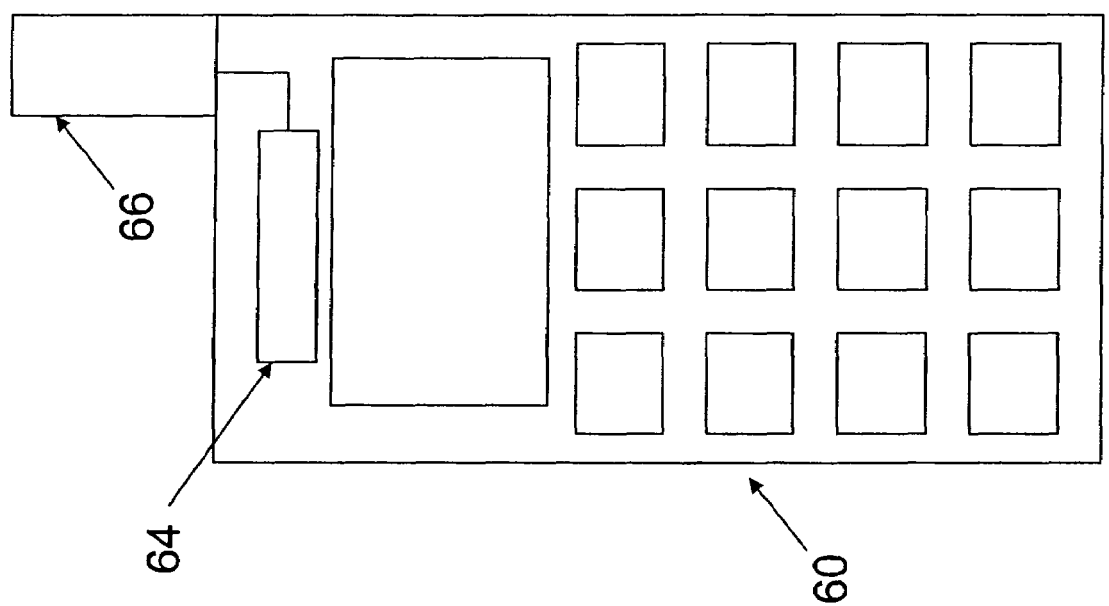
FIG. 6 is a block diagram of a cellular phone with a high frequency transmission path connecting an integrated circuit with an antenna.

FIG. 5 illustrates a waveform depicting the output from the switching mixer of FIG. 2. The switching mixer can perform IQ modulation as well as modulation with polar coordinates. Modulation in a polar fashion can be accomplished by setting the two baseband I- and Q- signals both equal to the desired amplitude signal. The phase information is then imparted by phase-modulating the clocking signals.

Mathematically, the switching mixer 18 performs an addition operation that can be represented by the formula:

$$I(t)\cos(w_c t) - Q(t)\sin(w_c t) \quad (1)$$

The signal $LO_I(t)$ is the repeating sequence {1 0 -1 0} at the sample period of a quarter carrier period ($T_c/4$). This sequence is the same as $\cos(w_c t)$ sampled and held at $4f_c$. As such, it consists of spectral lines at $4Nf_c \pm f_c$, where N is an integer from $-\infty$ to $\infty$. Within the band of $(-2f_c, 2f_c)$, however, it is identical to $\cos(w_c t)$. Therefore, the product $I(t) * LO_I(t)$ is equivalent to $I(t)\cos(w_c t)$ within the band $(-2f_c, 2f_c)$ (provided that I(t) is band-limited to $(-2f_c, 2f_c)$, which is required for RF modulation). Similarly, the signal $LO_Q(t)$ is the sequence {0 1 0 -1} at the sample rate of $4f_c$. Replacing $\cos(w_c t)$ and $\sin(w_c t)$ with the signals $LO_I(t)$ and $LO_Q(t)$ results in:

$$y(t) = I(t)LO_I(t) - Q(t)LO_Q(t) \quad (2)$$

When $LO_Q(T)$ is non-zero, $LO_I(t)$ is zero, and vice versa. For example:

$$\begin{aligned} 0 < t < T_c/4: & \quad LO_I(t) = 1 \quad LO_Q(t) = 0 \\ T_c/4 < t < T_c/2: & \quad LO_I(t) = 0 \quad LO_Q(t) = 1 \\ T_c/2 < t < 3T_c/4: & \quad LO_I(t) = -1 \quad LO_Q(t) = 0 \\ 3T_c/4 < t < T_c: & \quad LO_I(t) = 0 \quad LO_Q(t) = -1 \end{aligned} \quad (3)$$

This behavior repeats every $T_c$. The signal y(t) obtains the values:

$$\begin{aligned} 0 < t < T_c/4: & \quad y(t) = I(t)*1 - Q(t)*0 = I(t) \\ T_c/4 < t < T_c/2: & \quad y(t) = I(t)*0 - Q(t)*1 = -Q(t) \\ T_c/2 < t < 3T_c/4: & \quad y(t) = I(t)*-1 - Q(t)*0 = -I(t) \\ 3T_c/4 < t < T_c: & \quad y(t) = I(t)*0 - Q(t)*-1 = Q(t) \end{aligned} \quad (4)$$

This behavior repeats every $T_c$, such that:

$$\begin{aligned} NT_c < t < NT_c + T_c/4: & \quad y(t) = I(t)*1 - Q(t)*0 = I(t) \\ NT_c + T_c/4 < t < NT_c + T_c/2: & \quad y(t) = I(t)*0 - Q(t)*1 = -Q(t) \\ NT_c + T_c/2 < t < NT_c + 3T_c/4: & \quad y(t) = I(t)*-1 - Q(t)*0 = -I(t) \\ NT_c + 3T_c/4 < t < NT_c + T_c: & \quad y(t) = I(t)*0 - Q(t)*-1 = Q(t), \end{aligned} \quad (5)$$

$$N \in I\!N$$

As a result, a multiplexing operation between +/−I (t) and +/−Q (t) produces the intended quadrature mixing. Advantageously, the interleaved IQ modulator provides all gain stages at the base band, current backs off with reduced output, and both Polar and Cartesian coordinates can be handled. Because the modulator is in switched mode, there is high linearity and low noise.

The exemplary embodiments described herein can enable an RF transceiver to be an EDGE/GSM-capable integrated circuit and a WCDMA-capable integrated circuit. The embodiments can be implemented using CMOS technology. Advantageously, the modulator described herein combines analog or RF signals in IQ modulation by interleaving. Further, it can be implemented using one mixer instead of two separate mixers for I and Q signals and a summer block. The modulator described both up-converts and combines analog I and Q signals. Further, the modulator supports wide-band signals which may include zero-crossings.

An exemplary embodiment relates to an integrated circuit that provides in-phase and quadrature ("IQ") modulation by interleaving the in-phase and quadrature signals at a rate of 4× the carrier frequency. Interleaving these signals provides for a full quadrature modulation. As a result of the I and Q paths not being resistively summed together, there is no penalty in terms of power efficiency. The integrated circuit can be implemented in a switched-mode modulator, which would show high linearity, low noise, and low current consumption.

Another exemplary embodiment relates to an integrated circuit configured to perform IQ modulation by interleaving in-phase and quadrature signals where the integrated circuit includes a baseband in-phase stage that receives an in-phase analog input signal, a baseband quadrature stage that receives a quadrature analog input signal, and a switching mixer having a plurality of switches. The switching mixer receives in-phase and quadrature signals from the baseband in-phase stage and the baseband quadrature stage. The switching mixer produces a differential signal combining the in-phase and quadrature signals by interleaving the signals over a plurality of phases of a carrier period.

Another exemplary embodiment relates to a method of interleaving I and Q signals in IQ modulation. The method includes receiving a baseband in-phase analog signal, receiving a baseband quadrature analog signal, and interleaving the baseband in-phase analog signal and the baseband quadrature analog signal to form a combined signal. The interleaving is done over a plurality of phases of a carrier period.

Another exemplary embodiment relates to a modulator that combines in-phase and quadrature phase analog signals. The modulator includes a clocking mechanism that provides signals corresponding to phases of a carrier frequency and a plurality of switches that receive in-phase and quadrature phase analog signals and interleaves the in-phase and quadrature phase analog signals over phases of the carrier frequency.

The foregoing description of exemplary embodiments has been presented for purposes of illustration and description. It is not intended to be exhaustive or to limit to the invention to the precise form disclosed, and modifications and variations are possible in light of the above teachings or may be acquired from the practice of the invention. The embodiments were chosen and described in order to explain the principles of the invention and various embodiments and with various modifications as are suited to the particular use contemplated. While several embodiments have been described, it is understood that modification and changes will occur to those skilled in the art to which the invention pertains.

What is claimed is:

1. An integrated circuit configured to perform IQ modulation by interleaving in-phase and quadrature signals, the integrated circuit comprising:
    a baseband in-phase stage that receives an in-phase analog input signal;
    a baseband quadrature stage that receives a quadrature analog input signal; and
    a switching mixer having a first plurality of switches and a second plurality of switches, and the switching mixer receiving in-phase and quadrature signals from the baseband in-phase stage and the baseband quadrature stage, wherein
    each switch of the first plurality of switches is configured to apply a different one of a first, a second, a third, and a fourth phase of a plurality of phases a carrier period to a different one of a direct in-phase signal, an inverted in-phase signal, a direct quadrature signal, and an inverted quadrature signal derived from the in-phase and quadrature signals, and wherein the switching mixer is configured to combine resulting first up-converted signals to produce a first, interleaved differential signal component, and wherein
    each switch of the second plurality of switches is configured to apply the different one of the first, the second, the third, and the fourth phase to another different one of the direct in-phase signal, the inverted in-phase signal, the direct quadrature signal, and the inverted quadrature signal, and wherein the switching mixer is configured to combine resulting second up-converted signals to produce a second differential signal component, wherein
    the first differential signal component and the second differential signal component are produced as a differential output signal from the switching mixer, and wherein the differential output signal communicates a first direct and a first inverted in-phase signal during the first phase, a first direct and a first inverted quadrature signal during the second phase, a second direct and a second inverted in-phase signal during the third phase, and a second direct and a second inverted quadrature signal during the fourth phase.

2. The circuit of claim 1, further comprising an attenuator that controls power to the integrated circuit.

3. The circuit of claim 1, wherein the switches are transmission gates.

4. The circuit of claim 1, wherein the switching mixer receives a clocking signal that is directly generated from a voltage-controlled oscillator.

5. The circuit of claim 1, wherein the in-phase and quadrature phase signals are set to an amplitude signal for modulation in a polar coordinate system, and phase information is imparted through modulation of a clocking signal.

6. The circuit of claim 1, wherein the first, second, third, and fourth phases include plurality of phases is four phases operating every ¼ carrier period.

7. A method of frequency up-convening I- and Q- signals in IQ modulation, the method comprising:
    a switching mixer receiving a baseband in-phase analog signal, wherein the switching mixer includes a first plurality of switches and a second plurality of switches;
    the switching mixer receiving a baseband quadrature analog signal;
    the switching mixer deriving a direct in-phase signal, an inverted in-phase signal, a direct quadrature signal, and an inverted quadrature signal from the baseband in-phase analog signal and the baseband in-phase quadrature signal;
    the first plurality of switches producing first up-convened signals, by each switch of the first plurality of switches applying a different one of a first, a second, a third, and a fourth phase of a plurality of phases a carrier period to a different one of the direct in-phase signal, the inverted in-phase signal, the direct quadrature signal, and the inverted quadrature signal;
    the switching mixer interleaving the first up-converted signals to form a first combined signal, wherein the interleaving is done over the first, the second, the third, and the fourth phase;
    the second plurality of switches producing second up-converted signals, by each switch of the second plurality of switches applying a different one of the first, the second, the third, and the fourth phase to another different one of the direct in-phase signal, the inverted in-phase signal, the direct quadrature signal, and the inverted quadrature signal;

the switching mixer interleaving the second up-converted signals to form a second combined signal, wherein the interleaving is done over the first, the second, the third, and the fourth phase; and the switching mixer producing a differential signal that includes the first combined signal and the second combined signal.

8. The method of claim 7, where interleaving the baseband in-phase analog signal and the baseband quadrature analog signal is at a rate of four times a carrier frequency.

9. A modulator that combines in-phase and quadrature phase analog signals, the modulator comprising:

a clocking mechanism that provides signals corresponding to a first, a second, a third, and a fourth phase of a plurality of phases of a carrier frequency; and a first plurality of switches that receive a direct in-phase analog signal, an inverted in-phase analog signal, a direct quadrature phase analog signal, and an inverted quadrature phase analog signal, wherein each switch of the first plurality of switches is configured to apply a different one of the first, the second, the third, and the fourth phase to a different one of the direct in-phase signal, the inverted in-phase signal, the direct quadrature signal, and the inverted quadrature signal, and wherein the modulator is configured to combine resulting first up-converted signals to produce a first, interleaved differential signal component;

a second plurality of switches that receive the direct in-phase signal, the inverted in-phase signal, the direct quadrature signal, and the inverted quadrature signal, wherein each switch of the second plurality of switches is configured to apply the different one of the first, the second, the third, and the fourth phase to another different one of the direct in-phase signal, the inverted in-phase signal, the direct quadrature signal, and the inverted quadrature signal, and wherein the modulator is configured to combine resulting second up-converted signals to produce a second differential signal component, wherein the modulator is configured to produce the first differential signal component and the second differential signal component as a differential output signal, and wherein the differential output signal communicates a first direct and a first inverted in-phase signal during the first phase, a first direct and a first inverted quadrature signal during the second phase, a second direct and a second inverted in-phase signal during the third phase, and a second direct and a second inverted quadrature signal during the fourth phase.

10. The modulator of claim 9, further comprising amplifiers that up-convert the in-phase and quadrature phase analog signals.

11. The modulator of claim 9, wherein the plurality of switches are n-channel gates.

12. The modulator of claim 9, wherein the plurality of switches operate in a range of 1.0 to 2.0 GHz.

13. The modulator of claim 9, wherein the in-phase and quadrature phase analog signals correspond to cellular phone signals.

14. The modulator of claim 9, wherein the plurality of switches interleave the in-phase and quadrature phase signals by communicating in-phase and quadrature phase signals during alternating phases over the carrier period.

* * * * *

UNITED STATES PATENT AND TRADEMARK OFFICE
CERTIFICATE OF CORRECTION

PATENT NO. : 7,609,779 B2 Page 1 of 1
APPLICATION NO. : 11/363463
DATED : October 27, 2009
INVENTOR(S) : Poojan A. Wagh et al.

It is certified that error appears in the above-identified patent and that said Letters Patent is hereby corrected as shown below:

Column 6, line 53, "up-convened" should be changed to --up-converted--.

Signed and Sealed this

Sixteenth Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,609,779 B2  Page 1 of 1
APPLICATION NO. : 11/363463
DATED : October 27, 2009
INVENTOR(S) : Wagh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 693 days.

Signed and Sealed this

Twelfth Day of October, 2010

David J. Kappos
*Director of the United States Patent and Trademark Office*